United States Patent [19]
Heibel

[11] Patent Number: 5,745,538
[45] Date of Patent: Apr. 28, 1998

[54] SELF-POWERED FIXED INCORE DETECTOR

[75] Inventor: Michael D. Heibel, Penn Township, Pa.

[73] Assignee: Westinghouse Electric Corporation, Pittsburgh, Pa.

[21] Appl. No.: 539,803

[22] Filed: Oct. 5, 1995

[51] Int. Cl.⁶ .................................................. G21C 17/00
[52] U.S. Cl. ................................ 376/153; 376/254
[58] Field of Search ........................... 376/153, 154, 376/155, 254, 255; 250/370.09, 370.01, 370.02, 370.04, 370.05, 370.06, 372, 390.01, 392

[56] References Cited

U.S. PATENT DOCUMENTS

| | | | |
|---|---|---|---|
| 3,780,292 | 12/1973 | Klar | 250/390 |
| 4,288,291 | 9/1981 | Cisco et al. | 176/19 R |
| 5,225,149 | 7/1993 | Banda | 376/255 |
| 5,251,242 | 10/1993 | Impink, Jr. et al. | 376/254 |
| 5,297,174 | 3/1994 | Impink, Jr. et al. | 376/236 |

OTHER PUBLICATIONS

*Methods Used to Compensate the Delay Component of Platinum Self–Powered Detector;* presented at Proceedings of the IAEA Specialists' Meeting on Incore Instrumentation and Failed Fuel Detection and Location, Mississauga, Ontario, Canada, May 1974, (AELL 5129–L11); pp. 1–15; By P. Mercier.

*Primary Examiner*—Harvey E. Behrend

[57] ABSTRACT

A self-powered fixed incore detector for a nuclear reactor has a neutron sensitive emitter element having a low neutron absorption cross section, such as a vanadium element, which extends the length of the active fuel region and generates a full length signal representative of full length power. A number of gamma sensitive emitter elements, preferably platinum but alternatively zirconium, cerium, tantalum, or osmium elements, provide sequentially increasing overlap with the neutron sensitive emitter element to define axial regions of the active fuel region and generate apportioning signals. The portion of the full length signal generated by the neutron sensitive emitter element attributable to each of the axial regions of the core are determined from ratios of the apportioning signals generated by the gamma sensitive elements. While the ratioing of the apportioning signals reduces the effects of delayed gamma radiation from the products of fission, the transient response can be further improved by filtering out this component of the apportioning signals generated by the gamma sensitive emitter elements.

10 Claims, 2 Drawing Sheets

FIG.1
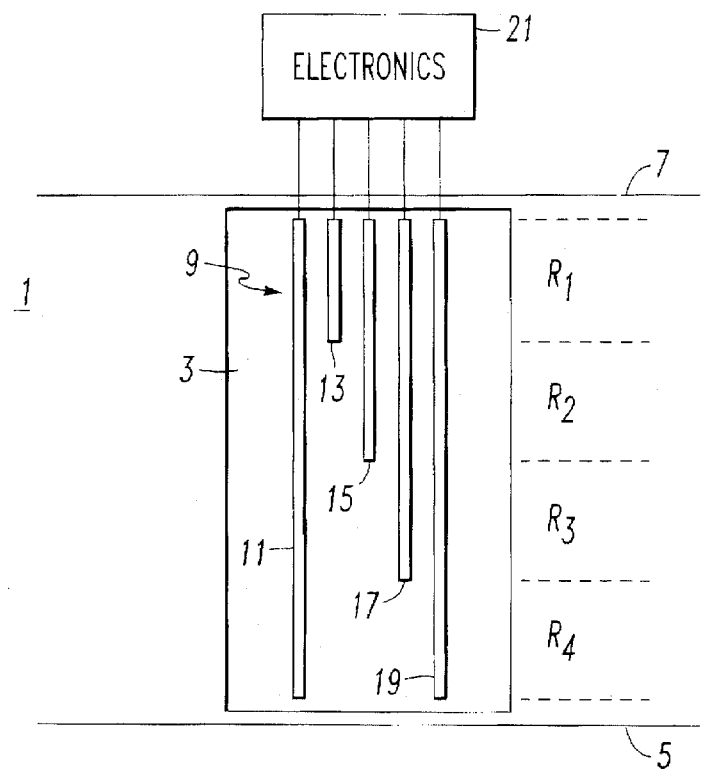
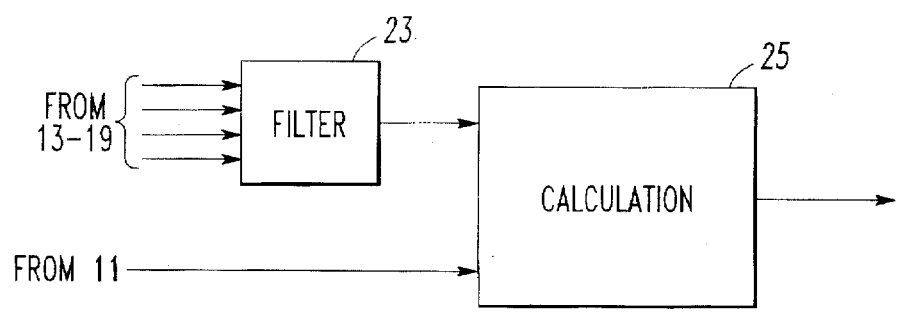
FIG.2

SELF-POWERED FIXED INCORE DETECTOR

BACKGROUND OF THE INVENTION

1. Field of the Invention

This invention relates to detectors for measuring neutron flux in the core of a nuclear reactor. More particularly, it relates to self-powered, fixed incore detectors utilizing a neutron sensitive detector element, such as vanadium, and gamma sensitive detector elements, such as platinum.

2. Background Information

Self-powered fixed incore detectors (FID) are commonly used for measurement of core power distribution in commercial nuclear power reactors. One type of self-powered FID utilizes neutron sensitive material, with rhodium being the most commonly used sensor element of this type. While such detector elements provide a direct measure of neutron flux, which in turn is directly related to core power, the materials of this type which are more responsive to neutrons are fairly rapidly depleted.

Another type of self-powered FID utilizes material sensitive to gamma radiation. While about 80% of the gamma radiation generated in the core is produced by the fission reaction and is therefore representative of core power, the remaining 20% is produced by products of fission and is delayed in time. While the gamma sensitive elements are not depleted by the neutron flux, they require complex electronics or reactor physics methods to provide a measure of reactor power distribution.

A major operational cost factor associated with the vast majority of the currently used rhodium FID is a need to replace the FID emitter elements when the concentration of the neutron sensitive nuclides in the element decreases such that the signal output from the individual emitters comprising the FID arrangement falls below usable levels. The typical cost associated with the replacement of spent FID elements is between 1 and 3 million dollars per operating cycle at plants currently using the rhodium FID emitter element. While the gamma sensitive FID might appear to be a viable alternative since they do not require frequent replacement due to emitter depletion, the complexity of the electronics or reactor physics method associated with the nondepleting FID element designs has made the overall costs of implementing the nondepleting FID element technology prohibitively costly.

Vanadium has been suggested for use as a neutron sensitive element. However, the thermal neutron absorption cross-section for vanadium is very low (~5b). Consequently, the signal output from a vanadium emitter element is very low relative to neutron sensitive FID elements such as rhodium. On the other hand, the low neutron absorption cross-section allows vanadium to deplete very slowly, which provides for extended operational life in the reactor core. However, in order to obtain the detailed axial power distribution information required to ensure the reactor is operating within its peaking factor limits, information on the amount of power being generated in axial core regions of between 20 and 30 inches in length are typically required. The necessary information is typically obtained from rhodium FID elements between 10 and 20 inches in length. Without extremely sensitive signal processing electronics, usable signals cannot be obtained from vanadium FID elements 20 inches in length over the range of reactor power levels required for core power distribution surveillance. It has been suggested in U.S. Pat. No. 5,251,242 that vanadium detectors can be used to calibrate gamma sensitive platinum detectors. The vanadium detectors can be either segments congruent with the platinum detector segments or a full length vanadium detector used in conjunction with a full length platinum detector. However, such a combination requires a complex reactor physics correction for the platinum detectors.

There is a need therefore, for an improved self-powered, fixed incore detector for measuring axial power distribution in a nuclear reactor.

More particularly, there is a need for such an improved self-powered incore detector which does not require frequent replacement of emitter elements.

Furthermore, there is a need for such an improved non-depleting self-powered incore detector which does not require sophisticated signal processing electronics or complex reactor physics methods to provide an accurate indication of core power distribution.

SUMMARY OF THE INVENTION

These needs and others are satisfied by the invention which is directed to a self-powered fixed incore detector arrangement utilizing gamma sensitive emitter elements of sequentially increasing lengths to determine the portions of a total signal obtained from a full core length slow depleting neutron sensitive emitter element due to the neutron flux present in different axial regions of the core. The proposed FID arrangement allows essentially a nondepleting FID emitter material, such as for instance vanadium, to be used, without requiring elaborate measurement electronics or reactor physics methods development, to generate signals for periodic core power distribution measurement or advanced continuous core monitoring applications.

While the signal level generated by the essentially non-depleting (in terms of the life of the reactor) neutron sensitive emitter element is low, only a single, full core length neutron sensitive emitter element is used so that the signal level is adequate without complex and expensive signal processors. The portions of the full-length signal generated by the single neutron sensitive emitter element attributable to various axial regions of the core are determined from apportioning signals generated by the different lengths of the gamma sensitive elements which define the axial regions of the core. The apportioning signals are ratioed which eliminates much of the effect of the delayed gamma radiation due to fission products. If desired, the distorting effects of rapid changes in axial power distribution produced by this delayed gamma radiation can be further eliminated by filters. Even so, the complex electronics or reactor physics models required for other gamma sensitive emitter elements is not necessary with the present invention.

More particularly, the invention is directed to a self powered fixed incore detector for measuring power distribution in a nuclear reactor core of given axial length comprising:

a neutron sensitive emitter element having a length extending from a first end of said neutron sensitive emitter element substantially along said given axial length of said nuclear reactor core for providing a full length signal; and a number of gamma sensitive emitter elements of different lengths, each having a first end adjacent the first end of the neutron sensitive emitter element and extending along said neutron sensitive emitter element to provide sequentially increasing overlap with the neutron sensitive emitter element which defines axial regions of said nuclear reactor core, and producing apportioning signals for proportionally determining a portion of the full length signal obtained from the neutron sensitive emitter element attributable to power in each of said axial regions of said nuclear reactor core.

Preferably, the neutron sensitive emitter element is made of vanadium and the gamma sensitive emitter elements are made of platinum.

BRIEF DESCRIPTION OF THE DRAWINGS

A full understanding of the invention can be gained from the following description of the preferred embodiments when read in conjunction with the accompanying drawings in which:

FIG. 1 is a schematic diagram illustrating the principle of a self-powered fixed incore detector in accordance with the invention.

FIG. 2 is a schematic diagram illustrating assessing of signals from the incore detector of FIG. 1 in accordance with one embodiment of the invention.

DESCRIPTION OF THE PREFERRED EMBODIMENT

Figure 3:
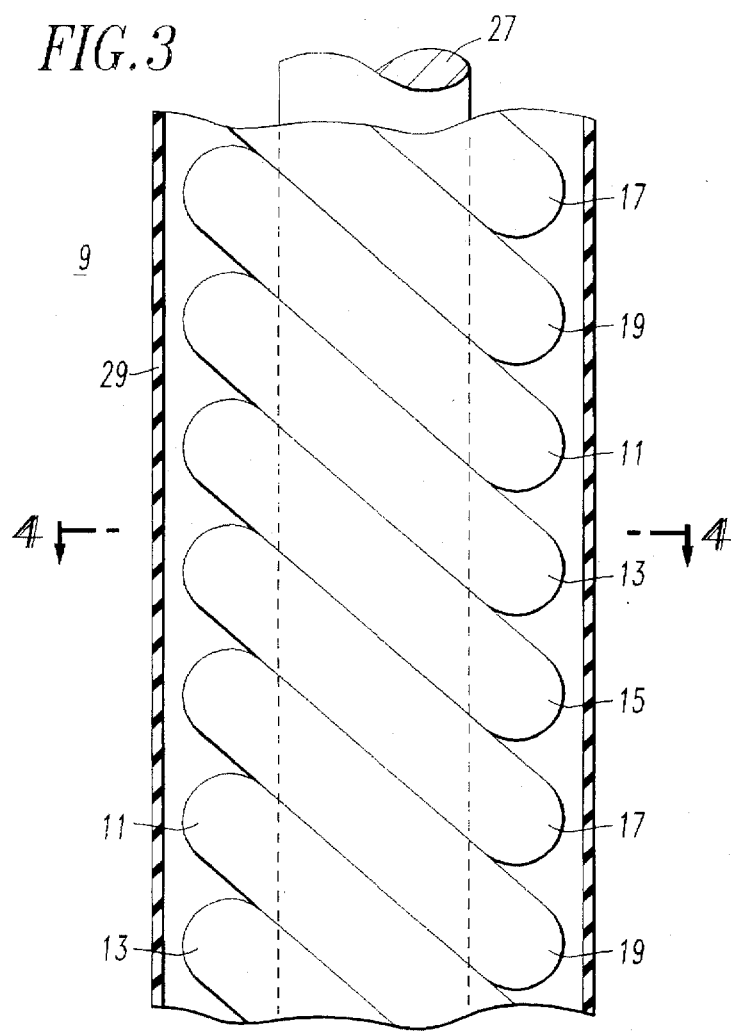
FIG. 3 in elevational view with parts broken away of a section of an incore detector in accordance with the invention.

Referring to FIG. 1, a nuclear reactor 1 as an active fuel region 3. In practice, the active fuel region 3 is formed by fissionable material contained in fuel rods mounted in a number of fuel assembles not shown supported between the lower core support plate 5 and upper support plate 7. In controlling and monitoring the operation of the reactor 1, it is important to know the axial distribution of power. For this purpose, the active fuel may be viewed as divided into a number of axial regions such as for example, the four Regions R1 to R4 shown in FIG. 1.

In accordance with the invention, the self-powered fixed incore detector 9 has a primarily neutron sensitive emitter element 11 which extends from about 12 inches below the top of the active fuel region 3 to about 12 inches above the bottom of the active fuel region 3, or in other words, substantially the full axial height of the active fuel region 3. The element 11, while neutron sensitive, has a low neutron absorption cross section which allows the element to deplete very slowly and therefore provides extended operating life. In a preferred embodiment of the invention, primarily neutron sensitive element 11 is made of vanadium which has a thermal neutron absorption cross section ~5b. While the sensitivity of the neutron sensitive emitter element 11 is low and therefore the signal output per unit length is low, the output of the element 11 does not require sensitive electronics as it extends its substantially the full length of the active full region, and therefore, generates a signal that can be processed with conventional electronics.

In order to apportion the contribution of the multiple regions R1 to R4 of the active fuel region 3 to the full length signal generated by the element 11, the incore detector 9 of the invention includes a plurality of primarily gamma sensitive emitter elements of sequentially increasing length corresponding to the axial regions of the active fuel region 3. Thus, in the exemplary incore detector 9, there are four gamma sensitive emitter elements 13, 15, 17 and 19 which provide sequentially increasing overlap with the neutron sensitive emitter element 11. The upper end of the elements 13, 15, 17, and 19 are all aligned with upper end of the element 11. The element 13 extends downward substantially the length of the top region R1, the element 15 corresponds in length to the regions R1 and R2, element 17 extends through regions R1–R3, and the element 19 is equal in length to the element 11, and therefore, extends through all the regions R1–R4. Thus, the shorter element 13 is equal to the length of the neutron sensitive emitter element 11 divided by the number of gamma sensitive emitter elements, and the longest gamma sensitive emitter element 19 is equal to the length of the neutron sensitive emitter element 11. In a more general sense, the length of each of the gamma sensitive emitter elements is equal to $$g_x = \frac{x}{n} l \qquad \text{Eq. 1}$$

where:

$g_x$=the length of the gamma sensitive emitter element.

x=the number of the gamma sensitive emitter element.

n=the total number of gamma sensitive emitter elements.

l=the length of the neutron sensitive emitter element.

The gamma sensitive elements in the preferred embodiment of the invention are platinum. Other suitable gamma sensitive elements include zirconium, cerium, tantalum, and osmium.

The axial configuration of detector elements illustrated in FIG. 1 would be contained in a thimble assembly which is inserted into the reactor core through the top of the reactor vessel. If the assembly containing the incore detector elements is inserted into the core from the bottom of the reactor vessel, then the axial configuration provided in FIG. 1 must be rotated 180 degrees.

The axial configuration of FID elements 11–19 provided in the incore detector 9 of the invention allows the amount of the total signal generated by the neutron sensitive emitter element 11 to be determined from information provided by the gamma sensitive emitter elements 13–19. Because the neutron sensitive emitter element 7 extends substantially the full height of the active fuel region 3, typically about 120 inches, the output signal is large enough to be measured using standard rhodium signal processing electronics 21 throughout the required reactor power levels, and for practically the entire life of the reactor. The gamma sensitive emitter elements 13–19, which are preferably platinum, are practically non-depleting, and therefore, will certainly last the entire life of the reactor. Because the reactor physics methods necessary to derive a neutron flux value from a vanadium signal are less complex than the methods required to derive a rhodium FID based neutron flux, the accuracy of the signal prediction methods should be improved over the current technology. Also, since the ends of all of the elements 11–19 are adjacent the edge of the active fuel region 3 so that electrical leads are not required to extend through a substantial portion of the active fuel region, the FID 9 does not require a direct signal leakage (or background) measurement for the FID elements, which reduces the number of signal outputs required from each FID 9 and reduces the uncertainty associated with the background correction.

The principles of proportional axial region signal separation embodied in the FID arrangement illustrated in FIG. 1 can be derived as follows:

Let V(t) represent the signal measured by the full-length vanadium element 11 shown in FIG. 1 with length H at time t with the reactor at a steady-state, full power, condition. V(t) may be expressed by the relation:

$$V(t) = S_v(t) \int_0^H \phi(t,z')dz' \qquad \text{Eq. 2}$$

The parameter $S_v(t)$ represents the relationship between the integrated thermal neutron flux and the measured vanadium element signal corresponding to the vanadium element depletion at time t.

The value of the signal P4 measured by the platinum element labeled 19 on FIG. 1 at the same reactor conditions and time may be expressed:

$$P4(t) = S_{p4}(t) \int_0^H \phi(t,z')dz' + B_4(t) \qquad \text{Eq. 3}$$

The parameter $S_{p4}(t)$ relates the thermal neutron flux and resultant fission gamma spectrum to the signal measured by platinum FID element 19, and is primarily determined by the physical properties per unit length of the element. The variable $B_4(t)$ represents the portion of the signal measured by the platinum element from all sources other than prompt fission gammas.

The amount of the total vanadium element signal generated in the axial core region labeled R4 on FIG. 2, given four equal length axial regions, may be expressed:

$$V_4(t) = S_v(t) \left[ \int_0^H \phi(t,z')dz' - \int_0^{\frac{3}{4}H} \phi(t,z')dz' \right] \qquad \text{Eq. 4}$$

The amount of the total vanadium signal produced in axial region R4 may also be expressed:

$$V_4(t) = \frac{V_4(t)}{V(t)} V(t) \qquad \text{Eq. 5}$$

Expressing Equation 5 in terms of integrated thermal neutron fluxes yields:

$$V_4(t) = \left[ \frac{\int_0^H \phi(t,z')dz' - \int_0^{\frac{3}{4}H} \phi(t,z')dz'}{\int_0^H \phi(t,z')dz'} \right] V(t) \qquad \text{Eq. 6}$$

The integrated flux terms in Equation 6 may be expressed in terms of the measured platinum element signal expression shown in Equation 3 by subtracting the nonfission term from the total platinum element signal for platinum elements 19 and 17. Equation 6 then becomes:

$$V_4(t) = \left[ \frac{(P4(t) - B_4(t)) - (P3(t) - B_3(t))}{(P4(t) - B_4(t))} \right] V(t) \qquad \text{Eq. 7}$$

The value of $B_4(t)$ can be determined by solving Equations 2 and 3 for the integrated thermal neutron flux term, setting the non-thermal flux integral sides of the resultant expressions equal to each other, and solving for $B_4(t)$. The resultant equation for $B_4(t)$ is:

$$B_4(t) = P4(t) - \frac{S_{p4}}{S_v} V(t) \qquad \text{Eq. 8}$$

In order to completely solve Equation 7, the value of $B_3(t)$ must also be determined. $B_4(t)$ represents the integrated amount of nonfission induced signal contained along the entire length of the vanadium detector element. It is reasonable to assume that the amount of nonfission gamma induced signal P3 measured by platinum element 17 will be some fraction of the nonfission gamma induced signal P4 measured by element 19. Assuming that the majority of the nonfission gamma induced portion of the platinum element signal P4 is attributable to fission products, then the portion of the total signal measured by the platinum element not caused by fission gammas should be proportional to the fission induced signal component. The assumption that the proportion of non-fission gamma induced signal in each platinum element is proportional to the fission gamma induced portion of the signal allows Equation 3 to be expressed:

$$P4(t) = S_{p4}(t)(1 - \gamma_4(t)) \int_0^H \phi(t,z')dz' \qquad \text{Eq. 9}$$

The term $\gamma_4(t)$ represents the fraction of the total signal P4 measured by platinum element 19 not due to fission gammas at time t.

Similarly, P3(t) may be expressed:

$$P3(t) = S_{p3}(t)(1 - \gamma_3(t)) \int_0^{\frac{3}{4}H} \phi(t,z')dz' \qquad \text{Eq. 10}$$

The fraction of $B_4(t)$ measured by element 17 is assumed to be related to the fraction of the total integrated thermal neutron flux sensed by element 17. Using Equations 9 and 10, and the assumptions listed above, the value of $B_3(t)$ may be expressed:

$$B_3(t) = \frac{P3(t)}{P4(t)} \frac{S_{p4}(t)(1 - \gamma_4(t))}{S_{p3}(t)(1 - \gamma_3(t))} B_4(t) \qquad \text{Eq. 11}$$

At or near steady-state it is reasonable to assume that the relative fraction of the total signal P4 measured by element 19 not included in fission gammas at time t will be the same as the relative fraction of the signal P3 present in element 17 not induced by fission gammas at time t. This assumption defines $\Gamma_4(t)$ to be equal to $\gamma_3(t)$ at time t. Also, providing the mechanical properties of the platinum elements are essentially identical, the values of $S_{p4}(t)$ and $S_{p3}(t)$ should be equal. These assumptions allow Equation 11 to be expressed:

$$B_3(t) = \frac{P3(t)}{P4(t)} B_4(t) \qquad \text{Eq. 12}$$

Substituting from Equation 8 allows Equation 12 to be expressed:

$$B_3(t) = P3(t) \left[ 1 - \frac{S_{p4}(t)}{S_v(t)} \frac{V(t)}{P4(t)} \right] \qquad \text{Eq. 13}$$

The value of $B_4(t)$ may also be expressed.

$$B_4(t) = P4(t) \left[ 1 - \frac{S_{p4}(t)}{S_v(t)} \frac{V(t)}{P4(t)} \right] \qquad \text{Eq. 14}$$

If we define the quantity K(t) as:

$$K(t) = \left[ 1 - \frac{S_p(t)}{S_v(t)} \frac{V(t)}{P4(t)} \right] \qquad \text{Eq. 15}$$

then Equation 7 may be expressed by:

$$V_4(t) = \left[ \frac{(P4(t)(1 - K(t)) - P3(t)(1 - K(t))}{P4(t)(1 - K(t))} \right] V(t) \qquad \text{Eq. 16}$$

or, $$V_4(t) = \left[ \frac{P4(t) - P3(t)}{P4(t)} \right] V(t) \qquad \text{Eq. 17}$$

Equation 17 indicates that the mount of the total vanadium element signal created in axial region R4 on FIG. 1 may be determined from the relative difference between the measured (raw) signals from platinum elements 19 and 17. Equation 17 will be exactly correct whenever the value of $\gamma_4(t)$ is equal to $\gamma_3(t)$ and $S_{p4}(t)$ is equal to $S_{p3}(t)$.

Once the value of $V_4(t)$ has been determined, the value of $V_3(t)$ may be determined from the expression:

$$V_3(t) = \left[ 1 - \frac{P2(t)}{P4(t)} \right] V(t) - V_4(t) \qquad \text{Eq. 18}$$

The value of $V_2(t)$ may then be determined from the expression:

$$V_2(t) = \left[ 1 - \frac{P1(t)}{P4(t)} \right] V(t) - V_4(t) - V_3(t) \qquad \text{Eq. 19}$$

The value of $V_1(t)$ may then be expressed as:

$$V_1(t) = V(t) - V_2(t) - V_3(t) - V_4(t) \qquad \text{Eq. 20}$$

The values of $V_1(t)$ through $V_4(t)$ may be convened to neutron reaction rates and used to determine the core power distribution in exactly the same fashion as any other neutron-sensitive FID element type (e.g., rhodium). No background correction needs to be applied to the axially segmented vanadium element signals.

The basis for the validity of the proportional axial region signal separation under steady-state conditions is the equality of the $\gamma$ values for all the platinum FID elements 13–19. As reactor power level and/or distribution changes occur, the platinum signals will change in response to fission and fission product level changes. Until the fission product concentrations return to a dynamic equilibrium with the fission power distribution, the $\gamma$ values of the different platinum elements will not be equal. In order for the proportional axial region separation principle to remain valid during reactor transients, the platinum signals from each element must be directly proportional to integrated neutron flux. Also, the constants of proportionality relating individual integrated neutron flux values and the corresponding platinum element signals must be equal. In order to satisfy these conditions during reactor transients, the portion of the signal induced by fission products must be removed or "filtered" from the measured platinum signal for each element.

A methodology for determining thermal neutron flux from a measured platinum detector signal is known. Pierre Mercier of Hydro-Quebec in Canada presents, in a paper entitled "Methods Used to Compensate Delay Component of Platinum Self-Powered Detector" presented at Proceedings of the IAEA Specialists' Meeting on Incore Instrumentation and Failed Fuel Detection and Location, Mississauga, Ontario, Canada, May 1974, (AELL 5129-L11), a simple first-order transfer function which may be used to determine the thermal neutron flux portion of a measured platinum detector signal. Assuming the sensitivities per unit length of the platinum elements are equal, the constants of proportionality between the compensated platinum signals and the corresponding integrated thermal flux should be equal for all the platinum elements. The application of the platinum signal compensation required to determine the portion of the platinum detector signals due to thermal neutron flux will assure that the basis for the proportional axial region signal separation of the measured vanadium element signal remains valid both in steady state and reactor power transient conditions. FIG. 2 illustrates the use of a filter 23 to extract the thermal neutron flux portion of the signals from the platinum detectors 13–19 before these signals are utilized together with a signal from the vanadium element 11 to calculate at 25 the power in their respective regions using the equation 17–20.

Figure 4:
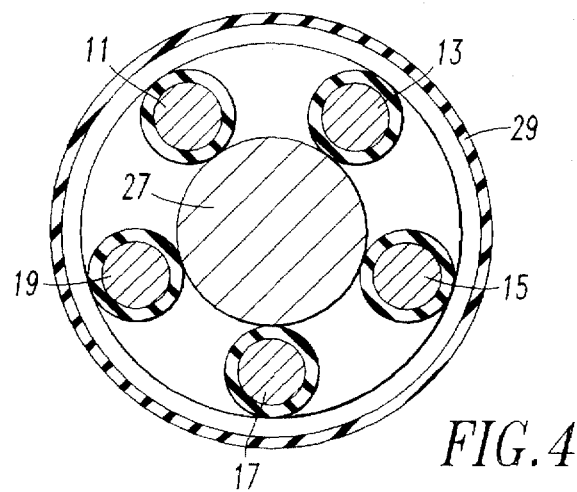
FIG. 4 is a cross section taken through the incore detector of FIG. 3 along the line 4—4.

FIGS. 3 and 4 illustrate a practical embodiment of the FID9. The elements 11–19 are wound around a mandrel 27 within a thimble 29 to provide more uniform exposure of the individual elements as the neutron flux is quite localized.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A self-powered fixed incore detector for measuring power distribution in a core of a given axial length of a nuclear reactor, said detector comprising:

a neutron sensitive emitter element constructed from a first material having a length extending from a first end of said neutron sensitive emitter element substantially along said given axial length of said core for providing a full length signal;

a number of gamma sensitive emitter elements of different lengths constructed from a second material which is different from the first material, each of said gamma sensitive emitter elements having a first end adjacent said first end of said neutron sensitive emitter element and extending along said neutron sensitive emitter element to provide sequentially increasing overlap with the neutron sensitive emitter element which defines axial regions of said core, and producing apportioning signals which substantially proportionally define the relative power in each of said axial regions of said core; and signal processing means which separately compares the signals from adjacent gamma sensitive emitters to define respectively the proportion of the total power represented by the non-overlapping, axial sections between such adjacent gamma emitters, and applies those proportions to the signal from the full neutron sensitive emitter element to provide outputs representative of the power in each of said axial regions of said core.

2. The self-powered fixed incore detector of claim 1 wherein said neutron sensitive emitter element comprises vanadium and said gamma sensitive elements are selected from a group comprising: platinum, zirconium, cerium, tantalum, and osmium.

3. The self-powered fixed incore detector of claim 1 wherein a longest of said gamma sensitive emitter elements has a length substantially equal to the length of said neutron sensitive emitter element.

4. The self-powered fixed incore detector of claim 3 wherein a shortest of said gamma sensitive emitter elements has a length substantially equal to said length of said neutron sensitive emitter element divided by said number of gamma sensitive emitter elements.

5. The self-powered fixed incore detector of claim 4 wherein said neutron sensitive emitter element comprises vanadium and said gamma sensitive emitter elements are selected from a group comprising: platinum, zirconium, cerium, tantalum, and osmium.

6. The self-powered fixed incore detector of claim 1 wherein said length of said neutron sensitive emitter element is equal to 1, the number of gamma sensitive emitter elements is equal to n and said gamma sensitive emitter elements have a length of $$\frac{x}{n} l,$$

where x is a number of the gamma sensitive emitter element and goes from 1 to n.

7. The self-powered fixed incore detector of claim 6 wherein said neutron sensitive emitter element comprises vanadium and said gamma sensitive emitter elements comprise platinum.

8. The self-powered incore detector of claim 6 wherein said number, n, of gamma sensitive emitter elements is at least equal to 4.

9. The self-powered incore detector of claim 8 wherein said neutron sensitive emitter element comprises vanadium and said gamma sensitive emitter elements are selected from a group comprising: platinum, zirconium, cerium, tantalum, and osmium.

10. The self-powered fixed incore detector of claim 1 wherein said signal processing means includes filter means filtering out effects of decay products on said apportioning signals.

* * * * *